Jan. 24, 1967     T. L. HOWEY     3,299,918
MACHINE SHOP COMBINATION
Filed Aug. 14, 1964     4 Sheets-Sheet 3
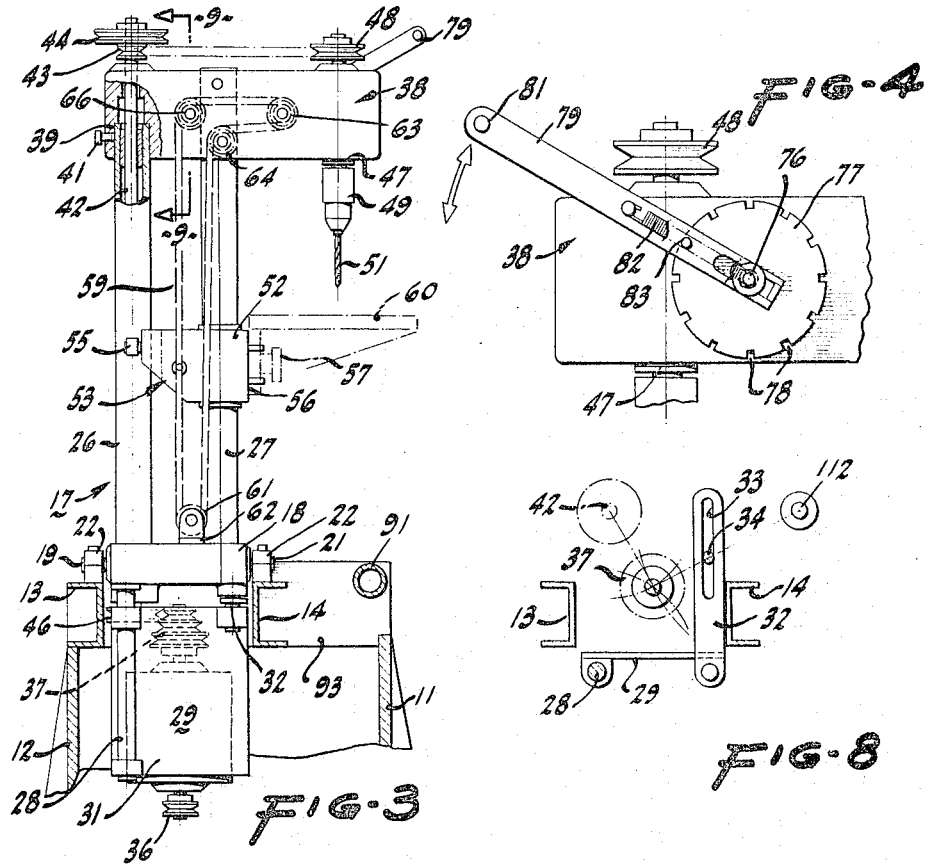
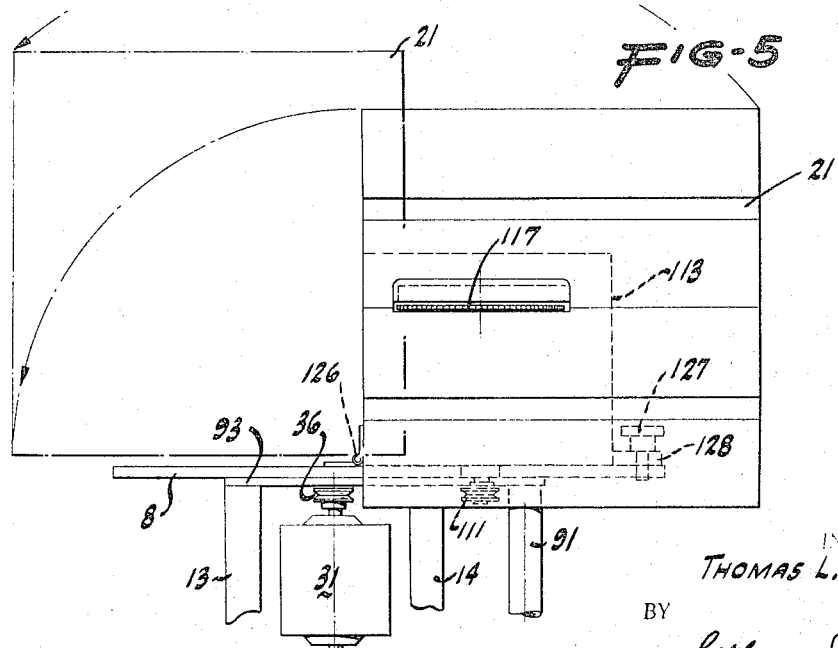
INVENTOR.
THOMAS L. HOWEY
BY
Lothrop & West
ATTORNEYS Jan. 24, 1967  T. L. HOWEY  3,299,918
MACHINE SHOP COMBINATION
Filed Aug. 14, 1964  4 Sheets-Sheet 4

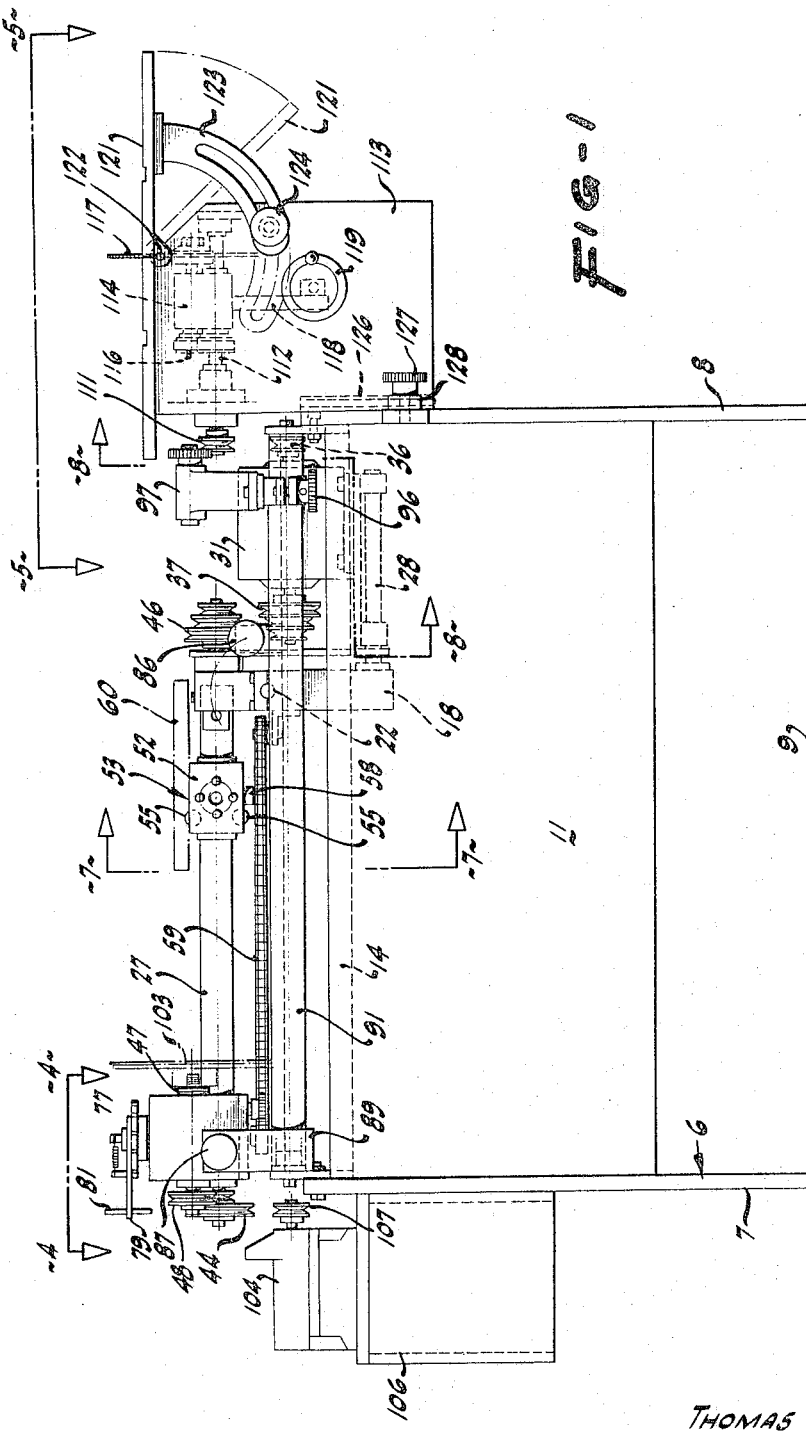

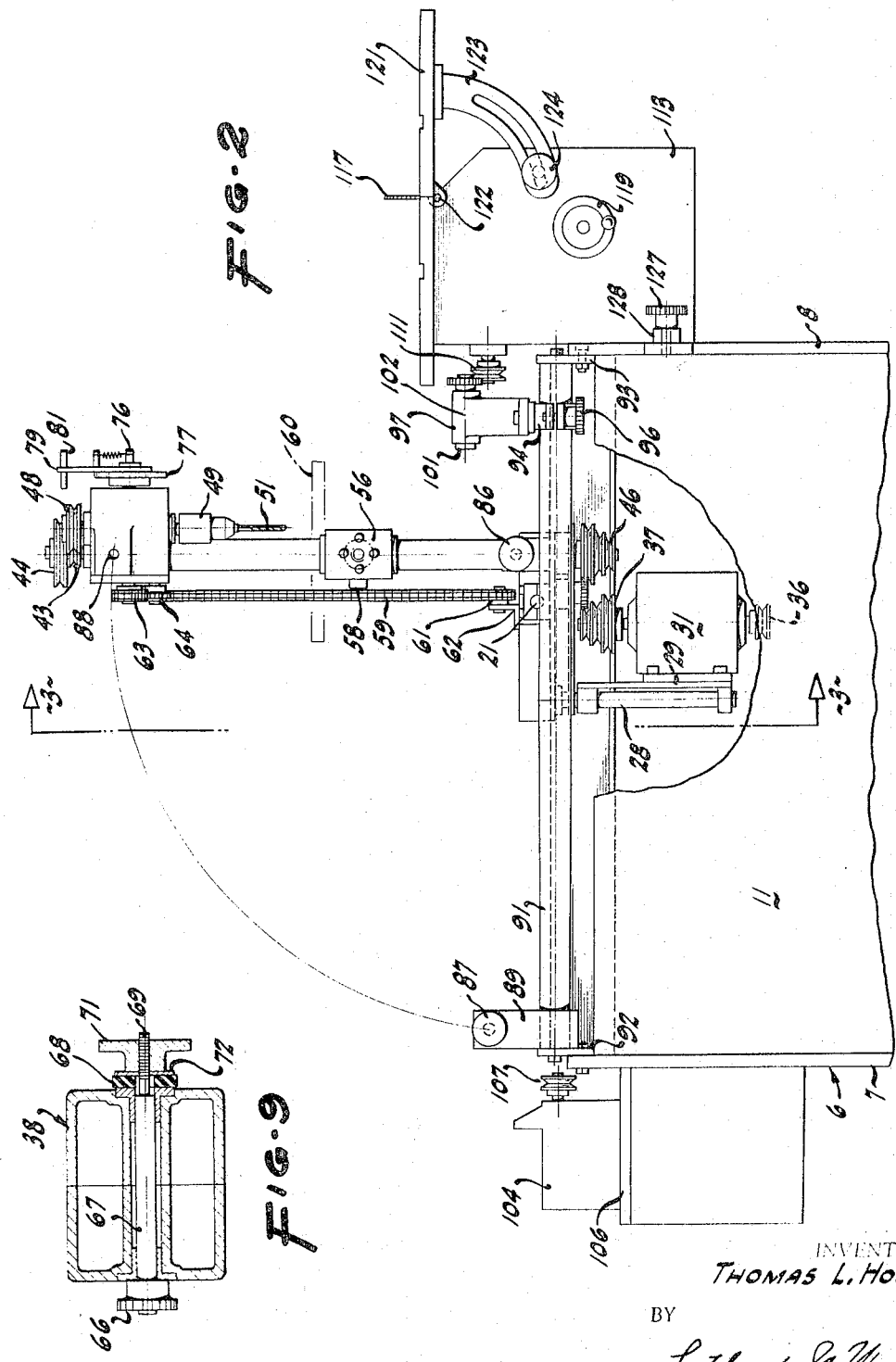

INVENTOR.
THOMAS L. HOWEY
BY
Lothrop & West
ATTORNEYS

United States Patent Office 3,299,918
Patented Jan. 24, 1967

3,299,918
MACHINE SHOP COMBINATION
Thomas L. Howey, 1629 Sherman Ave.,
Chico, Calif. 95926
Filed Aug. 14, 1964, Ser. No. 389,726
7 Claims. (Cl. 144—1)

My invention relates to means particularly useful in a home workshop but also useful in commercial establishments for affording a wide variety of tools in order to carry out a number of different construction operations.

While there are available certain combination tools which are suitable for use by the amateur as well as by the professional, there is a dearth of versatility in these machines, and they are in some respects too complex and costly for use in many different simple home environments.

It is therefore an object of my invention to provide an improved machine shop combination.

Another object of the invention is to provide a machine shop combination in which various tools can be utilized without interfering with each other.

Another object of the invention is to provide a machine shop combination in which a single electric motor as a source of power can easily be related to any one of a number of different tools for driving them.

A still further object of the invention is to provide a machine shop combination effective as a tool for working on various materials such as wood and metal.

Another object of the invention is to provide a machine shop combination in which the various tools are usable and controllable from a single operating station.

Another object of the invention is to provide a machine shop combination which is safe and effective in its operation and is so constructed as to remain in machining condition over a long period of time despite wear.

Other objects together with the foregoing are attained in the embodiment of the invention described in the accompanying description and illustrated in the accompanying drawings, in which:

FIGURE 1 is a front elevation of the machine shop combination of the invention;

FIGURE 2 is a fragmentary view primarily in front elevation and showing a portion of the combination in a different position;

FIGURE 3 is a cross section, the plane of which is indicated by the line 3—3 of FIGURE 2;

FIGURE 4 is a detail to an enlarged scale of part of a controlling mechanism;

FIGURE 5 is a fragmentary plan of one end of the machine shop combination;

FIGURE 8 is a detail in cross section, the plane of which is indicated by the lines 8—8 of FIGURE 1, showing a motor mounting structure; and FIGURE 9 is a detail in cross section, the plane of which is indicated by the line 9—9 of FIGURE 3.

Figure 6:
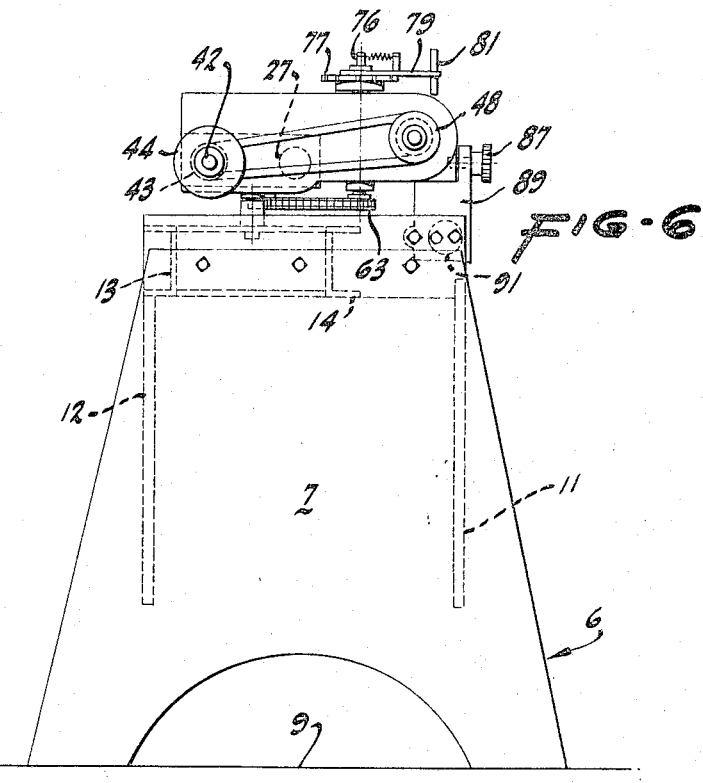
FIGURE 6 is an end elevation of another end of the machine shop combination.

While the machine shop combination of the invention can be embodied in a number of different ways, depending on the particular uses to which it is to be put and depending upon its particular environment of use, it has successfully been incorporated primarily for home operation as shown and described herein. In this arrangement there is provided a main frame 6. This includes a pair of end members 7 and 8 designed to rest on the floor 9 or other support and firmly connected together by longitudinal panels 11 and 12. Extending longitudinally between the end panels 7 and 8 are main frame rails 13 and 14 securely fastened at their ends. These rails can take on any convenient configuration, but preferably are oppositely facing channels so as to provide a generally horizontal, level bed surface 16.

Mounted on the channels 13 and 14 is a tool frame generally designated 17. This frame includes a cross yoke 18 having a pair of trunnions 19 and 21 mounted in journal blocks 22 so that the frame yoke 18 is rotatable about a horizontal transverse axis 23. Extending from both sides of the yoke 18 are tubes 26 and 27, the major portion of which is on one side of the yoke, and also extending from the yoke and parallel to the tubes 26 and 27 is a motor mount rod 28. Since the rod 28 and the tubes 26 and 27 are all considered as part of the tool frame 17, it can also be considered that the axis 23 is so disposed as to divide the tool frame into a major portion, to the left in FIGURE 1, and a minor portion, to the right in FIGURE 1.

As particularly illustrated in detail in FIGURE 8, there is pivotally mounted on the rod 28 a base 29 on which an electric drive motor 31 is secured with the rotational axis of the motor parallel to the axis of the rod 28 and also parallel to the axes of the rods 26 and 27. The motor is movably supported in that the plate 29 has a connecting strap 32 with an elongated opening 33 therein movable over a clamp screw 34, so that by tightening the clamp screw the motor axis can be disposed at any desired attitude or height with respect to the rod 28.

The motor is connected to any suitable source of electricity by regular means (not shown) and is preferably of the type having pulleys 36 and 37 at both ends of the motor shaft so that drive power can be taken from both ends of the motor.

At the ends of the tool frame tubes 26 and 27 opposite the yoke 18 there is mounted a tool head 38. This is a rigid frame having sockets 39 therein receiving the ends of the tubes 26 and 27 and held in position by a fastening screw 41. Journalled in the tube 26 and passing through the tool head 38 is a drive shaft 42 which extends at one end beyond the tool head and carries a plurality of pulleys 43 and 44 thereon. At the other end, the drive shaft 42 extends from the tube 26 in the vicinity of the pulleys 37 and itself carries a pulley 46 in alignment with one of the pulleys 37.

Figure 7:
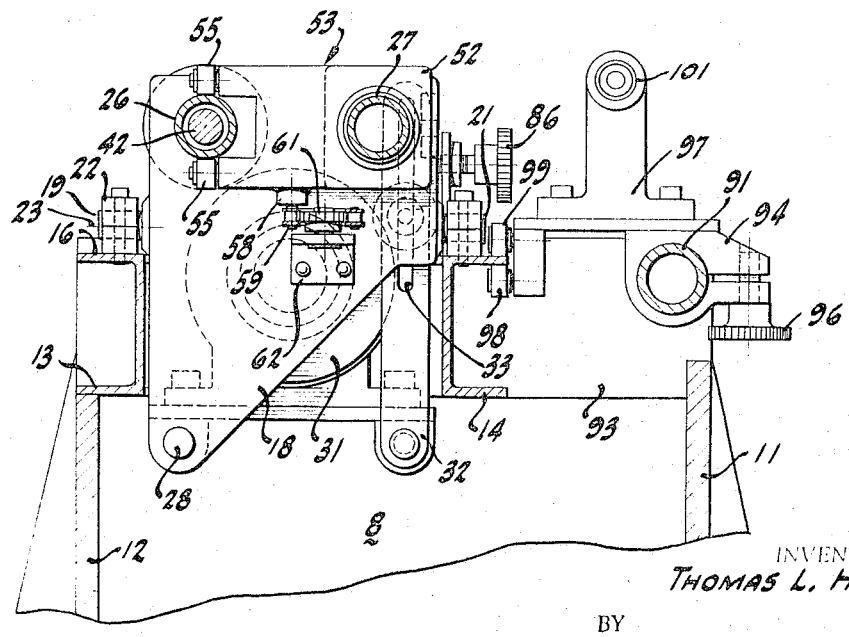
FIGURE 7 is a cross section, the plane of which is indicated by the line 7—7 of FIGURE 1.

Journalled in the tool head 38 is a tool support 47 arranged with its axis parallel to the axis of the shaft 42 and provided at one exposed end with a pulley 48 in alignment with the pulley 43 and provided at the other end with a tool fastening 49 such as a drill chuck or the like for the purpose of receiving a twist drill 51 or comparable rotary tool. Other tool fastenings than the drill chuck 49 can be mounted on the tool support 47, but in the event a drill or like tool is employed, means are provided for cooperating with the drill to hold the work. For that reason, there is provided on the tube 27 a surrounding collar 52 slidably mounted on the tube and included in a carriage 53 which extends toward the tube 26. A pair of rollers or wheels 55 (FIGURE 7) ride on the sides of the tube 26 and assist in mounting the carriage 53 for sliding or reciprocating movement along the tool frame. The tool carriage 53 has a number of mounting surfaces 56 against which a drill table 60 or the like can be secured by fastening means 57 of such nature that while the table can be accurately mounted and aligned, it can easily be removed or mounted in different positions on the carriage 53.

So that the carriage 53 can be located at any desired distance with respect to the drill and can be moved in order to afford a work feeding mechanism, the movable carriage is provided with a lug 58 secured to an endless link chain 59 extending in both directions from the lug 58. At one end the chain is brought around a sprocket 61 pivotally mounted in a bracket 62 extending from the yoke 18, and at the other end the chain 59 is led around a sprocket 63 journalled on the tool head 38. Because of the location of the sprocket 63, the chain 59 is trained around a pair of idler sprockets 64 and 66 also pivotally mounted on the tool head 38.

As particularly illustrated in FIGURE 9, the sprocket 63 is mounted on a through shaft 67 journalled in the hollow tool head and extending from the opposite sides thereof. A friction disc 68 surrounds the threaded end 69 of the shaft 67 and a thumb wheel 71 screwed onto the end 69 urges a friction plate 72 against the friction disc 68 and against the side of the tool head. When the hand wheel 71 is loose, there is no resistance to the rotation of the shaft 67 and the sprocket 63 can be freely operated. The carriage 53 can thus be easily moved along the tubes 26 and 27. When the hand wheel 71 is tightened so that the friction plate 72 and the friction disc are squeezed against the side of the tool head, then the sprocket 63 cannot rotate and the carriage 53 is held in any set position.

As a means of moving the carriage, the shaft 76 (FIGURE 4) of the pulley 63 extends through the tool head 38 and at its other end carries a disc 77 having a plurality of peripheral notches 78 therein. Journalled on the shaft 76 is slotted lever 79 having a handle 81 at one end and carrying a spring 82 which urges a pin 83 slidably mounted on the arm 79 into any one of the notches 78, so that upon rotation of the handle 81 the chain is properly driven, provided the hand wheel 71 is released. The pin 83 can be manually lifted from the notches 78 against the urgency of the spring 82 to free the operating handle 81 from the driving disc 77. In this fashion, the carriage 53 can be moved to any desired location along the tubes 26 and 27 and can be held firmly in any such selected position. This mechanism is primarily useful in the drilling operation which is customarily done with the tool frame in its vertical position, as shown in FIGURE 2. In vertical position, the tool frame is locked by a hand wheel 86 which can be screwed into and out of an appropriate socket on the yoke 18.

When some operation other than drilling is to be accomplished, the hand wheel 86 is released and the tool frame is swung from its vertical position into its horizontal position. This is easily done since the weight of the parts on opposite sides of the pivotal axis 23 is approximately equal, so that the motor end of the tool frame nearly balances the tool head end thereof. When the tool frame is in its horizontal position, it is locked therein by tightening a hand wheel 87 which engages a socket 88 on the tool head 38. The hand wheel 87 is mounted in a bracket 89 upstanding from one end of a lathe rail 91 extending between brackets 92 and 93 outstanding from the main frame, particularly the channel 14 thereof. The lathe rail is a circular cylindrical tube extending for substantially the entire length of the main frame and not only carries the bracket 89, but likewise carries a split collar 94 (FIGURE 7) tightened or loosened by a hand wheel 96. The collar 94 is part of a tailstock frame 97 which carries a pair of roller wheels 98 and 99 engaging the upper flange of the channel 14, so that when the hand wheel 96 is loose, the tailstock frame 97 can be moved to and fro along the lathe rail 91, but when the hand wheel 96 is tightened, the tailstock frame is locked in longitudinal position. Upstanding from the tailstock frame 97 is a tailstock 100 of the usual sort found in lathes and carrying a rotatable center 101 having an axis 102 that is in horizontal alignment with the axis of the tool support 47 when the tool frame is secured in its horizontal position, so that by the utilization of a lathe plate 103 (FIGURE 1) in place of the chuck 49, there is provided a lathe effective between the headstock and the tailstock 100.

Since all of the drives from the electric motor 31 between the various pulleys are preferably accomplished by V belts or the like, advantage is taken of the availability of the pulley 44 when the tool frame is in horizontal position to drive an auxiliary tool such as a joiner 104. This is conveniently mounted on a bracket 106 extending from the end wall 7 of the main frame 6 and is disposed so that its driven pulley 107 is in alignment with the pulley 44. When the tool frame is in horizontal position a V belt can be placed around the pulleys 44 and 107 so that the joiner is readily driven. When the joiner is disconnected by removal of the belt, then the tool frame can be restored to its vertical position.

Somewhat similarly, at the other end of the structure advantage is taken of the pulley 36 at the outboard end of the drive motor 31. When the tool frame is locked in horizontal position, the pulley 36 is in alignment with a driven pulley 111 at the end of a drive shaft 112 (FIGURE 1) mounted in a saw frame 113. The drive shaft 112 is parallel to a saw arbor 114 driven from the shaft 112 by a belt 116 and carrying a disc saw 117. Thus when the pulleys 36 and 111 are connected by a V belt, the saw 117 is appropriately driven. A suitable vertically variable, adjusting mount 118 is provided for the saw arbor under the control of a hand wheel 119 so that the height of projection of the saw above a saw table 120 mounted on the saw frame 113 can be varied. Since the saw arbor itself is not tiltable, I provide an outboard portion 121 of the saw table that is mounted on a pivotal fastening 122 in the plane of the saw blade 117 and includes a bracket 123 slidable on a hand wheel clamp 124 so that the saw table portion 121 can be rotated and held at any angle between a horizontal position as shown in full lines in FIGURE 1 and a dotted line tilted position in that figure.

It is not always desired to have the saw in position for operation, and it is considered advisable sometimes to have the saw out of the way. For that reason, the saw frame 113 is connected to the main frame, particularly to the end panel 8 thereof, by means of a vertical hinge mounting 126. Also provided is a securing hand wheel 127 engageable with a forked lug 128 on the saw table and with the end panel 8 of the main frame so that when it is in active position with the pulley 111 aligned with the pulley 36, the saw is firmly mounted, but when the drive belt is removed from the pulley 111 and the hand wheel 127 is slacked off, then the saw frame 113 can be swung horizontally through approximately a ninety degree turn into an out-of-the-way position as indicated by the dotted lines in FIGURE 5.

Since a drive belt engaging the motor pulley 36 is sometimes engaged with a pulley 111 and sometimes a drive belt engages the pulleys 37 at the other end of the motor shaft to operate the pulleys 46 at the end of the drive shaft 42, some adjustment of the motor shaft position may be necessary. This is accomplished by loosening the fastening screw 34 and by tilting the motor mount plate 29. As shown in FIGURE 8, movement of the motor in a generally upward direction in that figure tightens the belt to the pulley 111, whereas movement of the motor downwardly in that figure tightens the belt to the pulleys 46.

What is claimed is:
1. A machine shop combination comprising:
   (a) a main frame including a pair of parallel horizontal frame rails;
   (b) a tool frame including a pair of parallel tubes;
   (c) means for mounting said tool frame on said main frame for pivotal movement about a transverse axis located between the ends of said tool frame and dividing said tool frame into major and minor portions;
   (d) an electric motor mounted on said minor portion of said tool frame;
   (e) a tool head mounted on said major portion of said tool frame;
   (f) a drive shaft journalled in one of said parallel tubes and extending from the ends thereof and through said tool head;

(g) pulleys on the extending ends of said drive shaft;
(h) means for connecting said electric motor to one of said pulleys;
(i) a tool support journalled in said tool head;
(j) means for connecting said tool support to the other of said pulleys;
(k) means for releasably fastening said tool frame in a horizontal position on said main frame;
(l) means for releasably fastening said tool frame in a vertical position on said main frame;
(m) a carriage slidable along said parallel tubes;
(n) a chain mechanism secured to said carriage and extending between said tool frame and said tool head for sliding said carriage along said parallel tubes;
(o) means mounted in said tool head for actuating said chain mechanism; and,
(p) means on said tool head for locking said chain mechanism to prevent sliding of said carriage along said parallel tubes.

2. A machine shop combination comprising:
(a) a main frame including a pair of parallel horizontal frame rails;
(b) a tool frame including a pair of parallel tubes;
(c) means for mounting said tool frame on said main frame for pivotal movement about a transverse axis located between the ends of said tool frame and dividing said tool frame into major and minor portions;
(d) an electric motor mounted on said minor portion of said tool frame;
(e) a tool head mounted on said major portion of said tool frame;
(f) a drive shaft journalled in one of said parallel tubes and extending from the ends thereof and through said tool head;
(g) pulleys on the extending ends of said drive shaft;
(h) means for connecting said electric motor to one of said pulleys;
(i) a tool support journalled in said tool head;
(j) means for connecting said tool support to the other of said pulleys;
(k) means for releasably fastening said tool frame in a horizontal position on said main frame;
(l) means for releasably fastening said tool frame in a vertical position on said main frame;
(m) a saw frame;
(n) a saw arbor mounted on said saw frame;
(o) means for mounting said saw frame for pivotal movement about a vertical axis between one position with said saw arbor parallel to said horizontal rails and another position with said saw arbor normal to said horizontal rails;
(p) means for releasably holding said saw frame in said one position; and,
(q) means for connecting said saw arbor when said saw frame is in said one position with said motor when said tool frame is in said horizontal position.

3. A machine shop combination as in claim 2 including a saw table, and means for mounting at least a portion of said saw table on said saw frame for pivotal movement about an axis lying in a plane normal to the axis of said saw arbor.

4. A machine shop combination comprising:
(a) a main frame including a pair of parallel horizontal frame rails;
(b) a tool frame including a pair of parallel tubes;
(c) means for mounting said tool frame on said main frame for pivotal movement about a transverse axis located between the ends of said tool frame and dividing said tool frame into major and minor portions;
(d) an electric motor mounted on said minor portion of said tool frame;
(e) a tool head mounted on said major portion of said tool frame;
(f) a drive shaft journalled in one of said parallel tubes and extending from the ends thereof and through said tool head;
(g) pulleys on the extending ends of said drive shaft;
(h) means for connecting said electric motor to one of said pulleys;
(i) a tool support journalled in said tool head;
(j) means for connecting said tool support to the other of said pulleys;
(k) means for releasably fastening said tool frame in a horizontal position on said main frame;
(l) means for releasably fastening said tool frame in a vertical position on said main frame;
(m) a bracket on said main frame;
(n) a rotary tool on said bracket; and,
(o) means for connecting said rotary tool in driving relationship to said other pulley when said main frame is in said horizontal position.

5. A machine shop combination as in claim 1 in which said carriage includes a collar mounted on one of said tubes, wheels on said collar movably engaging the other of said tubes, and means on said collar for fastening a drill table thereto.

6. A machine shop combination comprising:
(a) a horizontally elongated main frame;
(b) a tool frame including a tube shorter in length than said main frame;
(c) means for mounting said tool frame on said main frame between the ends of said main frame for pivotal movement about a transverse axis located between the ends of said tool frame and dividing said tool frame into major and minor portions;
(d) an electric motor mounted on said minor portion of said tool frame;
(e) a tool head mounted on said major portion of said tool frame;
(f) a drive shaft journalled in said tube and extending from the ends thereof and through said tool head;
(g) pulleys on the extending ends of said drive shaft;
(h) means for connecting said electric motor to one of said pulleys;
(i) a tool support journalled in said tool head;
(j) means for connecting said tool support to the other of said pulleys;
(k) means for releasably fastening said tool frame in a vertical position on said main frame, said tool head being located above said main frame between said ends thereof in said vertical position of said tool frame; and,
(l) means for releasably fastening said tool frame in a horizontal position on said main frame, said tube being located above said main frame and between said ends of said main frame in said horizontal position of said tool frame.

7. A machine shop combination as in claim 6 in which said major portion and said minor portion of said tool frame and elements supported thereon are substantially in balance about said transverse axis when said tool frame is in said horizontal position and when said tool frame is in said vertical position.

References Cited by the Examiner
UNITED STATES PATENTS

| | | | |
|---|---|---|---|
| 2,517,608 | 8/1950 | Taylor | 144—1 |
| 2,623,269 | 12/1952 | Goldschmidt | 29—560 |
| 2,661,037 | 12/1953 | McGihon | 144—1 |
| 2,927,612 | 3/1960 | Edgemond et al. | 144—1 |

WILLIAM W. DYER, JR., *Primary Examiner.*

W. D. BRAY, *Assistant Examiner.*